United States Patent

[11] 3,565,449

| [72] | Inventors | Ramon J. Ascencio, Chicago,<br>Eugene A. Brochaus, Oak Park, and<br>Alvin J. Frustenburg, Chicago |
| --- | --- | --- |
| [21] | Appl. No. | 781,923 |
| [22] | Filed | Dec. 6, 1968 |
| [45] | Patented | Feb. 23, 1971 |
| [73] | Assignee | Felt Products Mfg. Co. |

[54] HEAD GASKET ASSEMBLY HAVING PARTS THEREIN
9 Claims, 7 Drawing Figs.

[52] U.S. Cl. .................................................. 277/235
[51] Int. Cl. .................................................. F16j 15/12,
F16j 15/28; F02f 11/00
[50] Field of Search .......................................... 277/235,
235 (B), (Inquired); 92/169, 171 (Inquired)

[56] References Cited
UNITED STATES PATENTS

| 1,627,167 | 5/1927 | Fitzgerald | 277/235B |
| 1,843,297 | 2/1932 | Oven | 277/235B |
| 3,108,818 | 10/1963 | Furstenburg | 277/235X |
| 3,433,490 | 3/1969 | Teucher et al. | 277/235B X |

FOREIGN PATENTS

| 1,487,373 | 5/1967 | France | 277/235B |

Primary Examiner—Mark M. Newman
Attorney—Dressler, Goldsmith, Clement & Gordon

ABSTRACT: A method of making an improved head gasket assembly and an improved head gasket assembly. A head gasket body is provided with cylinder openings. A second gasket comprising a U-shaped annulus and having a plurality of peripheral tongues is formed and positioned in a cylinder opening. The second gasket tongues project over the main gasket body to suspend and position the annulus in a spaced-apart position in the opening.

INVENTORS
Ramon J. Ascencio
Eugene A. Brockhaus
Alvin J. Furstenburg
by Dressler, Goldsmith, Clement & Gordon
att'ys PATENTED FEB23 1971 3,565,449
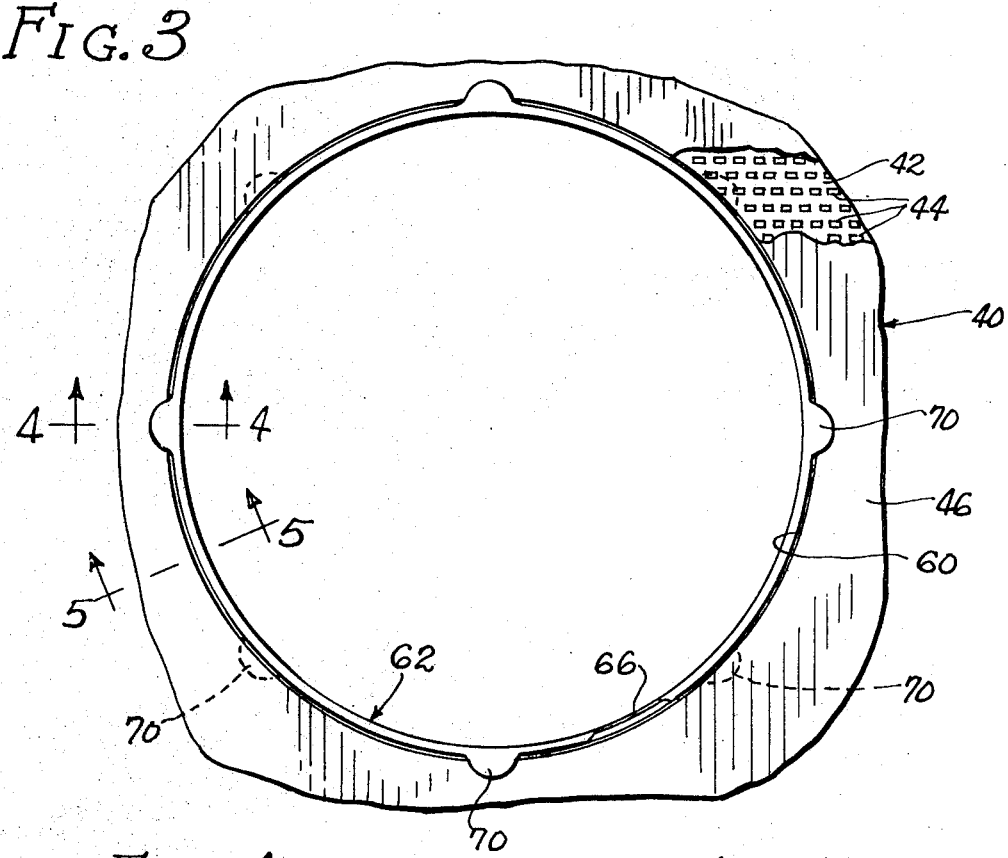
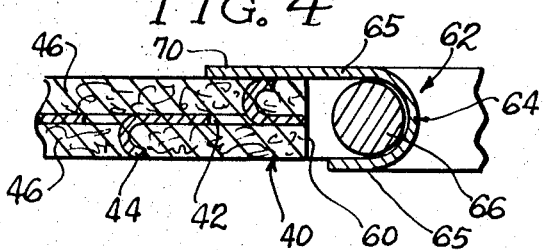
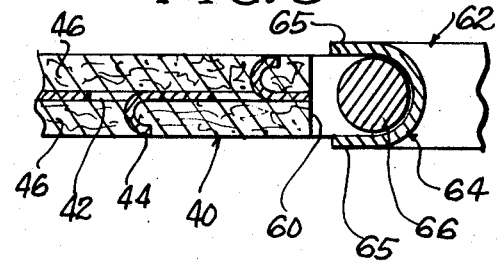
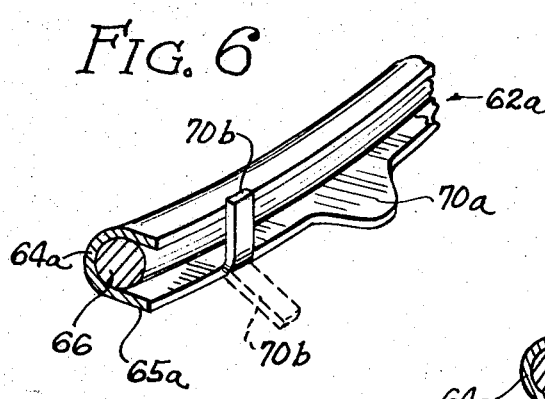
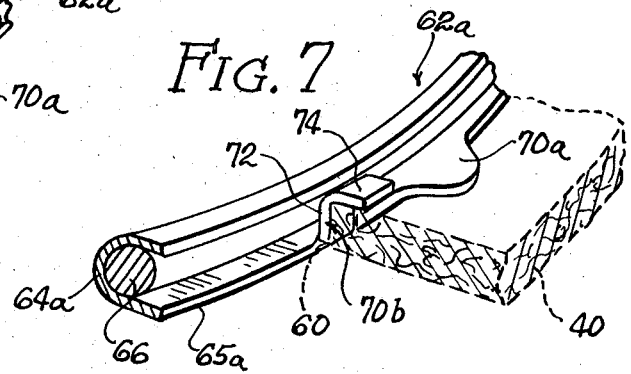

HEAD GASKET ASSEMBLY HAVING PARTS THEREIN

There are a variety of head gaskets known in the prior art. Head gaskets generally comprise thin flat bodies which define a plurality of apertures, including oil and water openings and cylinder openings. These apertures are positioned in the gasket body to be aligned with cylinder bores and with water and oil ports in an engine block and engine head. The gasket body itself is intended to seal around the apertures in it to prevent bore and port intercommunication.

In large high-compression engines operating at high temperatures and high pressures, it has been a practice for a number of years now to provide head gaskets with armoring adjacent the cylinder or combustion openings to seal the cylinder openings and to protect the remainder of the gasket from the effects of the high temperature and pressure. Quite frequently the gasket body itself comprises an asbestos or reinforced asbestos or impregnated asbestos packing material, which body is then provided with the aforementioned armor. A construction of that general character which is known to the art is illustrated in U.S. Pat. No. 1,819,694. In that construction, the entire gasket surface as well as the cylinder openings in the gasket are armored.

It has been found subsequently that armor enclosing the edge of the gasket body adjacent the cylinder opening is sufficient to protect the gasket and to seal the head and block at the cylinder bore. In one typical construction, also known to the art, a main gasket body comprises sheets of impregnated asbestos secured to opposite sides of a metal sheet. The combustion openings in the gasket body are enclosed by U-shaped metal annuli which surround the cylinder bores. These U-shaped annuli surround the periphery of the combustion openings and extend outwardly over and under the periphery of the opening. Although such constructions are suitable for many applications, they are not for others. In some constructions for which they are suitable, they do not always seal correctly and therefore cause serious sealing problems.

It has also been suggested that head gasket assemblies be provided in which an armored gasketing is positioned in a combustion opening and be suspended from tabs formed from the main gasket body and which project inwardly of the combustion opening and into engagement with the armor. Although this very substantially improves upon known prior art head gasket assemblies, the head gasket of this invention provides yet other and further advantages and highly desirable head gasket assembly constructions.

In accordance with this invention, an improved gasket assembly is provided which is suitable for use in applications for which prior art assemblies are not suitable. They are also well suited for applications in which prior art assemblies are suitable. In some respects, the gasket assembly of this invention isolates the functions of the main body of the gasket and the cylinder bore armored sealing gasket means while providing an integrated assembly which may be handled and utilized as a single unit. Further, the gasket assembly of this invention is simpler and less expensive to make.

To that end, a gasket assembly, such as a head gasket assembly, of this invention comprises a main gasket body defining a combustion opening proportioned and positioned to surround a cylinder bore. Within, but spaced slightly inwardly of the periphery of the combustion opening, a second gasket means is provided, the second gasket means being adapted to be sealingly compressed between an engine block and a head. The second gasket means is suspended in the combustion opening in the main gasket body by a plurality of spaced projecting tongues integral with the second gasket means which bridge the space between the second gasket means and the main body gasket and which operatively interconnect the two. Preferably, the second gasket means is an armored gasket means which may comprise a U-shaped metal annulus which opens towards the combustion opening of the main gasket body and provides the projecting tongues. The U-shaped annulus may be at least partially preformed and assembled with a metal wire ring for subsequent assembly in the gasket body combustion opening. Although the gasket assembly is generally flat, the gasket means lying generally parallel to and generally within the combustion opening, it will be apparent that in use the gasket means may be displaced somewhat with respect to the main body without disturbing or displacing the periphery of the main body adjacent the edge of the opening.

Further purposes objects and advantages of this invention will become apparent from the following description and appended drawings showing a presently preferred embodiment, of which:

FIG. 3 is an enlarged plan view of a portion of FIG. 1;

FIG. 4 is an enlarged sectional view taken substantially along the line 4—4 of FIG. 3;

FIG. 5 is an enlarged sectional view taken substantially along the line 5—5 of FIG. 3;

FIG. 6 is a perspective view of a portion of further embodiment of a gasket assembly of this invention; and FIG. 7 is a further view of the gasket assembly of FIG. 6.

Figure 1:
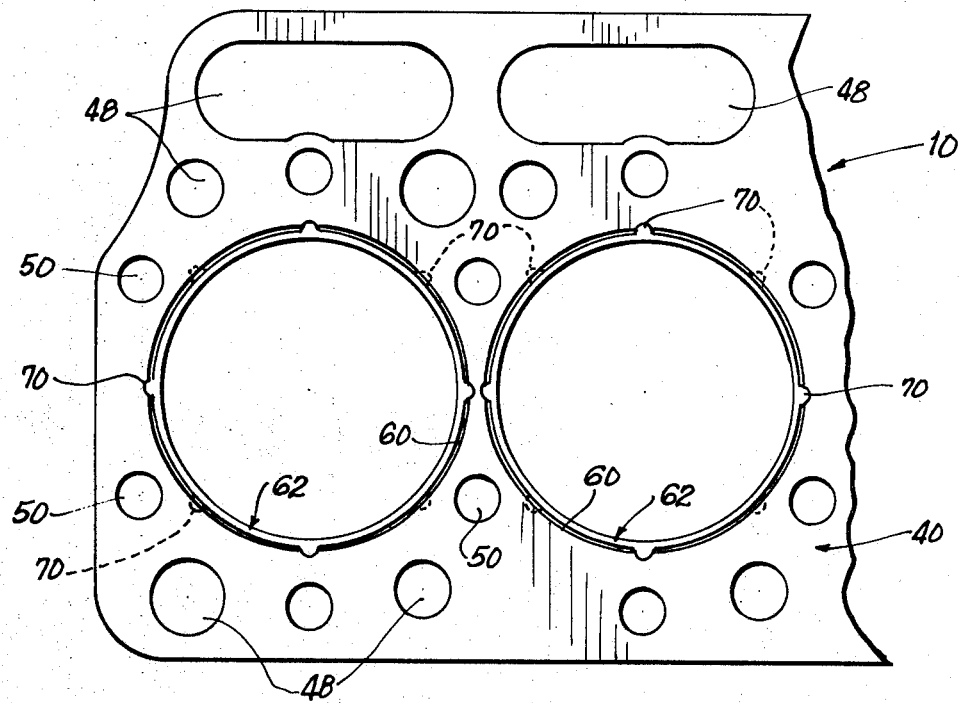
FIG. 1 is a plan view of a cylinder head gasket constructed in accordance with this invention.
Figure 2:
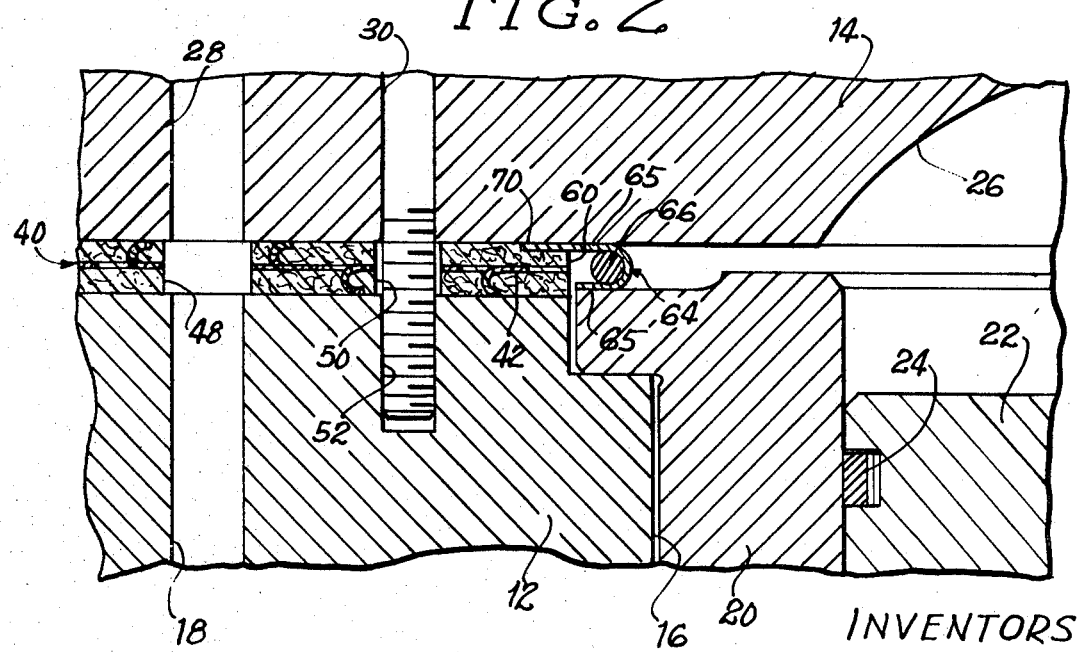
FIG. 2 is a sectional view through a head and engine block with which a gasket of FIG. 1 has been assembled.

Referring first to FIGS. 1 and 2, a head gasket assembly 10 of this invention is adapted and proportioned to cooperate with an engine block 12 and an engine head 14. It is, of course, apparent that a variety of engine block and head configurations, hence head gasket assembly configurations, may be employed in accordance with this invention.

Block 12 defines a plurality of apertures including a plurality of cylinder bores 16 and a plurality of cylindrical oil or water bores 18 (only one of each of which bores 16 and 18 are illustrated in FIG. 2). Cylinder bores 16 are fitted with cylinder sleeves 20 which sealingly engage the cylinder wall and serve to cooperate with a piston 22 and piston rings 24 in a known manner. Head 14 defines a dome-shaped portion 26 overlying cylinder bore 16, and further defines a plurality of oil and water bores 28 which are aligned with complementary bores 18. Threaded bolts 30 connect the head and block and serve as the means for compressing gasket assembly 10 into sealing engagement with the block and head around the apertures therein.

As seen, the gasket assembly 10 comprises a main gasket body 40, which body is a multilayer assemblage. Body 40 comprises a central layer 42 which is a metal sheet which has had prongs punched outwardly from both sides. Then each side of central layer 42 is fitted with a sheet of impregnated asbestos 46, with such as a conventional temperature, oil and water resistant impregnant. The sheets are then superposed with each other and are pressed together, the prongs folding to the positions illustrated to hold the sheets to the central layer.

Thereafter suitably positioned and proportioned apertures and openings are formed as by punching. These openings and apertures include oil and water apertures 48 which are proportioned and positioned to surround the confronting ported ends of bores 18 and 28. Apertures 48 permit flow communication between bores 18 and 28 and sealingly prevent leakage of fluid beyond the apertures 48. Bolt holes 50 are also provided in the gasket assembly to accommodate passage of bolts 30 through head 14 and into threaded engagement with cooperating threaded holes 52 in the block.

Finally, the gasket assembly defines a plurality of apertures which surround the cylinder bores, adjacent which apertures the cylinders are sealed from the surrounding portions of the gasket assembly. To that end, the main gasket body 40 defined a plurality of clear through combustion openings 60. A second gasket means is provided within the periphery defined by each of these openings. As shown in the drawings, a second gasket 62 comprises a generally U-shaped metal annulus 64 which is parallel to and coplanar with the main gasket body. In the closed end of the annulus, a wire ring 66 is provided to assist in sealing in a manner known to the art. The legs 65 of the annulus are spaced apart and parallel and at their ends define an open annulus and which opens towards the periphery of the combustion opening 60. The annulus open end is spaced slightly from said periphery as is most clearly illustrated in FIG. 5.

Second gasket 62 is secured to and suspended within combustion opening 60. That is accomplished by a plurality of spaced tongues 70 which extend to and beyond the periphery of opening 60. These tongues are formed integrally with the legs 65 of metal annulus 64 and project across the space between annulus 64 and the periphery of combustion opening 60 to suspend and position gasket 62 within opening 60 and on main gasket body 40. It will be observed in the embodiment illustrated in the drawings that the peripherally spaced tongues 70 alternately overlie and underlie main gasket body 40 to suspend the second gasket regardless of the orientation of gasket assembly 10. The tongues are narrow and discrete and project over and under the main gasket body only a distance necessary to insure the integrity of the assembly prior to installation in the event of shifting of the second gasket sidewise with respect to the main gasket body.

It will be apparent that the second gasket may be prepared for assembly with main body 40 as a subassembly. Thus the wire ring 66 may be assembled with an annulus blank which has the tongues 70 on one leg 65 bent upwardly so that the annulus may be dropped into opening 60 and onto the tongues 70 on the other leg for subsequent rebending of the bent tongues to the positions illustrated in FIGS. 1—5.

Unique head gasket assemblies and special advantages and cost reduction in manufacture of them are provided by the embodiment illustrated in FIGS. 6 and 7. As there shown, a main gasket body 40 and a second gasket assembly 62a is provided. Second gasket assembly 62a comprises a U-shaped metal annulus 64a which surrounds a wire ring 66.

A plurality of second gasket suspending tongues are also provided. It will be observed, however, that the tongues are formed integrally with one of the legs 65a of the U-shaped annulus rather than peripherally alternately with both of the legs of the annulus as illustrated in conjunction with the embodiment of FIGS. 1 to 5.

Thus the tongues comprise a plurality of peripherally spaced first tongue elements 70a and a plurality of peripherally spaced second tongue elements 70b. The number of tongue elements, as illustrated by FIG. 3, may be eight, with four equally spaced elements 70a and four equally spaced elements 70b. Pairs of elements 70a and 70b may be spaced closely together as illustrated in FIGS. 6 and 7 or may be spaced apart equidistant from each other as shown in FIG. 3.

Tongue elements 70a may be indentical to those shown in FIG. 3. Tongue elements 70b however, are elongate. After wire ring 66 is positioned within, and the annulus is formed thereabout, tongues 70b are bent upwardly from the positions illustrated in phantom in FIG. 6 to that shown in full line. That full line position serves to provide a second gasket subassembly which retains the ring 66 and which may be dropped into an opening 60 as a subassembly. When it is dropped into opening 60 it is supported therein by tongues 70a. Thereafter tongues 70b are folded intermediate their lengths leaving portions 72 in confronting relation to the wire ring and providing portions 74 generally parallel to tongues 70a overlying the opposite side of he main gasket body 40. It will be apparent that striking the tongues from the same side of the annulus blank simplifies fabrication of the annulus and permits the preassembly of the second gasket means, a clear and very substantial advantage over prior art constructions in which assembly of the armor required simultaneous forming of the armor about the wire at the time it was to be secured in the combustion opening and to the main gasket body. That and other advantages are obtained in accordance with this invention.

In a typical gasket assembly of this invention, a main gasket body 40 is about 0.045 inch thick, a butt-welded soft steel annealed wire ring 66 is about 0.036 inch in diameter, a U-shaped metal annulus is formed of 0.006 inch type 321 stainless stock, and the combustion opening is about 5 inches in diameter. It will be understood that the gasket assembly 10 is subjected to different conditions at different locations. At the armored cylinder openings, extremely high temperatures and pressures of up to as much as 2,400 p.s.i. are encountered. Further, the cylinder openings are exposed to flame and sparks. However, the pressure of the oil and water in bores 18 and 28 seldom exceeds 100 p.s.i. This then requires a much greater sealing force at the cylinder bore than at the oil and water apertures.

The gasket assembly of this invention provides many notable advantages over prior art head gaskets. In prior art gaskets a typical U-sahped metal annulus provided portions confronting the upper and lower surfaces of the main gasket body around the entire periphery of the combustion openings 60. With a head gasket of that type, a very substantial amount of pressure was necessary to coin the legs of the U into the planes of the gasket body surfaces. Of course, until there was such coining, the gasket assembly would not seal around the oil and water apertures, nor would it effectively seal around the cylinder bore.

In a typical prior art gasket of the type just referred to and incorporating a central layer, two impregnated asbestos facing sheets and having an overlapping U-shaped annulus of the type referred to, substantial coining pressures were required. For an overlap of the legs of the U with the main gasket body of about 0.060 inch and with an opening diameter of about 5 inches, almost 1 square inch of metal required coining into the gasket body. It took almost 20,000 lb. of force to coin the legs into the gasket body and to the level of the surface planes of the gasket body.

From the illustrations herein, it is seen that the small peripherally spaced tongues, (even assuming an overlap of the gasket body of 0.060 inch by the tongues) present a very small area where coining is required, i.e., a very small fraction of the 1 square inch of a comparable prior art gasket. That means that an additional substantial force is available to compress the gasket assembly to a sealing condition beyond that which was available previously, assuming the same total amount of head and block assembly force is used. Because the full compressive assembly load is available for sealing (substantially none being required for coining), more effective sealing adjacent the oil and water apertures and at the cylinder bores is obtained. Elimination of the requirement of a substantial coining force also makes it possible to reduce the assembly load where other conditions made that feasible. It is also apparent that the nominal area of the tongues means that some force applied will compress them easily into the gasket body.

It has also been found that a head gasket assembly of this invention, i.e., one in which the cylinder gasket means is suspended from the main gasket body by a plurality of spaced tongues integral with the cylinder gasket means, results in a more uniform head and block assembly with less effective warpage, bowing, and distortion of the head. In prior art constructions of the type describe when bolts 30 are drawn down to provide the assembly force, the head will bow slightly because of the excessive coining forces encountered. That then results in forces other than tensile forces acting on bolts 30 sometimes resulting in fracture of the bolts. With gasket assemblies of this invention, the head and block assembly tend to retain their desired parallelism under compression and the head vibrates less when the engine is in use.

Yet another advantage of the gasket assembly of this invention is what may be described as an effective isolation of the cylinder gasket means from the main gasket body. As seen in FIG. 2, the second gasket means does not necessarily remain equidistant from the main body surfaces. That, as there shown, is because of the sleeve 20 standup, i.e., its elevation above the bottom surface of the main body of the block. When that occurs with a U-shaped annulus overlying and underlying the main body as in the prior art constructions, the entire edge of the gasket body surrounding the opening will be raised upwardly around the combustion area. Especially where oil and water holes are quite close to the cylinder openings 42 or the cylinder openings are very close together, poor sealing and leakage has occurred, endangering the life of the gasket assembly and giving rise to unwanted intermixture of the fluids in the areas intended to be sealed from each other.

Utilizing the tongues of this invention, their effective area and cross section being nominal, sleeve standup or offset of the second gasket with respect to the main body is a minimal problem. Indeed utilization of gasket assemblies in environments of substantial offset are contemplated where, for example, during assembly separation of the two gasket elements entirely may take place without affecting the sealing qualities of either.

It is also clear that the positioning of the tongues on the annulus simplifies manufacture of the overall gasket assembly in several regards. In addition to those advantages already mentioned, it will be observed that the combustion openings 60 are smooth and have no tabs or the like projecting toward the annulus. Thus the main gasket body is easier to fabricate. Further, in accordance with this invention, the cylinders may be more closely placed because the tongues are in the armor rather than either tabs being provided which project from the combustion opening periphery or requiring, as in the prior art, complete enclosure of the combustion opening periphery. This gives more latitude in engine design and provides suitable unitary gasket assemblies for difficult existing applications.

It will be apparent from the foregoing that modifications of the embodiment illustrated may be made without departing from the spirit and scope of this invention.

I claim:

1. In a head gasket assembly comprising a heat-sensitive multilayered main gasket body defining a combustion opening and a plurality of other apertures therein, a second centrally apertured metallic-armored gasket means suspended in said combustion opening and positioned inside of the periphery of said opening, the improvement comprising a plurality of widely spaced discrete peripheral elements formed integrally with said second armored gasket means and projecting outwardly from said armored gasket means, across any space between said armored gasket means and said periphery, and toward said multilayered main gasket body, some of said peripheral elements located above said main gasket body and some located below for suspending and positioning said second gasket means in said combustion opening.

2. In the gasket assembly of claim 1 wherein said armored gasket means comprises a metallic wire ring and a U-shaped metal annulus opening toward said periphery and surrounding said wire ring.

3. In the gasket assembly of claim 1 wherein said armored gasket means is a U-shaped annulus opening towards said periphery and each of the legs of said annulus mounts some of said plurality of peripheral elements.

4. In the gasket assembly of claim 1 wherein said armored gasket means is a U-shaped annulus opening towards said periphery and one of the legs thereof mounts all of said plurality of peripheral elements.

5. In a gasket assembly comprising a main gasket body defining an opening therein, a second centrally apertured armored gasket means of a construction different from that of said main gasket body suspended in said opening and spaced inwardly of the periphery of said opening, the improvement comprising a plurality of widely spaced peripheral elements formed integrally with said second gasket means and projecting outwardly of said gasket means and toward and over and under said main gasket body for suspending and positioning said second gasket means in said opening, said armored gasket means being a U-shaped annulus opening towards said periphery and one of the legs thereof mounting all to said plurality of peripheral elements, some of said peripheral elements being folded substantially at right angles to said leg and being folded substantially at right angles to said leg and being return folded intermediate their lengths to project in the same direction as the other of said peripheral elements.

6. In a gasket assembly comprising a U-shaped metal annulus opening outwardly of its outer perimeter and encircling and enclosing a wire ring, the improvement comprising a plurality of tongues integral with said annulus and all formed integrally with one of the legs of the annulus, at least some of said tongues being folded to project across said opening to prevent removal to said wire ring, said gasket assembly being proportioned to be received within a gasket opening, said tongues being proportioned to suspend said gasket assembly in said gasket opening.

7. In a head gasket assembly comprising a generally flat main gasket body defining a plurality of apertures for sealing communication with a plurality of ports in an engine block and an engine head, at least one of said apertures comprising a generally circular combustion opening for surrounding an engine cylinder port, and an armored gasket section generally parallel to said main gasket body, said armored gasket section comprising a U-shaped metal annulus, said annulus opening outwardly toward the periphery of said combustion opening, said armored gasket section lying within said opening but being spaced from the periphery of said combustion opening, the improvement comprising a plurality of space, narrow, radially extending tongues integral with said annulus and projecting across the space between said annulus and said main gasket body adjacent said periphery with some of said tongues located above said gasket body and some located below for suspending said armored gasket section from said main gasket body, the preponderance of the space between the annulus and the periphery being open.

8. In the head gasket assembly of claim 7, in which said armored gasket section further comprises a wire ring surrounded by said annulus.

9. In the head gasket assembly of claim 7 in which said tongues project from one of the legs of said annulus only, some of said tongues being folded adjacent said leg and folded intermediate their lengths to provide a portion which lies in a spaced parallel relationship to the other of said tongues.

PO-1050
(5/69)

UNITED STATES PATENT OFFICE
CERTIFICATE OF CORRECTION

Patent No. 3,565,449      Dated February 23, 1971

Inventor(s) Ramon J. Ascencio et al

It is certified that error appears in the above-identified patent and that said Letters Patent are hereby corrected as shown below:

In the title "PARTS" should be --PORTS-- (two occurrence Col. 2, line 21, after "of" (second occurrence) insert --a--; line 66, "defined" should be --defines--. Col. 3, line 61, "he" should be --the--. Col. 4, line 11, "sahped" should be --shaped--; line 55, "describe" should be --described--. Col 6, lines 14 & 15, after "leg" delete "and being folded substa tially at right angles to said leg"; line 24, "to" should be --of--.

Signed and sealed this 6th day of July 1971.

(SEAL)
Attest:

EDWARD M. FLETCHER, JR.
Attesting Officer

WILLIAM E. SCHUYLER, JR.
Commissioner of Patents